United States Patent [19]

Boothroyd et al.

[11] 3,970,992

[45] July 20, 1976

[54] TRANSACTION TERMINAL WITH UNLIMITED RANGE OF FUNCTIONS

[75] Inventors: William A. Boothroyd; Boyd W. Sorensen, both of San Jose, Calif.

[73] Assignee: IBM Corporation, Armonk, N.Y.

[22] Filed: June 25, 1974

[21] Appl. No.: 483,058

[52] U.S. Cl. .................... 340/172.5; 235/617 B; 340/149 A
[51] Int. Cl.[2] .................... G06K 7/01; H04Q 5/00
[58] Field of Search ......... 340/172.5, 149 A, 152 R; 235/61.7 B

[56] References Cited
UNITED STATES PATENTS

| | | | |
|---|---|---|---|
| 3,778,595 | 12/1973 | Hatanaka et al. | 340/149 A |
| 3,833,885 | 9/1974 | Gentile et al. | 340/149 A |

*Primary Examiner*—Vincent P. Canney
*Attorney, Agent, or Firm*—Fraser and Bogucki

[57] ABSTRACT

A user transaction terminal which may be connected for communication with a large scale data processing system includes a card handling subsystem which receives and transports user information cards; a user communication subsystem which includes a keyboard and an optical display; a hardware control subsystem which operates terminal hardware, a transaction statement subsystem which prints and dispenses written records of user transactions; a terminal communication subsystem which provides communication with a data processing system; a processor support subsystem which assists a control subsystem by performing control functions which are more easily implemented with hardware than software; and a control subsystem which includes a programmed microprocessor which is connected to the other subsystems via an information bus to coordinate and control the operations of the other subsystems. The keyboard includes a plurality of mutually exclusive keyboard fields, each relating to a different type of information. These fields include a function selection field, a from account field, a to account field, and a numeric field. The transaction selection, from account, and to account fields each include an optional selection key, the activation of which permits a user to enter key modifier data corresponding to the field of an activated optional selection key by activating a selected, predetermined combination of keys within the numeric field in accordance with a prearranged schedule. This convenient, simple keyboard thus contains separate keys for the most commonly used information states for each field as well as optional selection keys which greatly expand the information which may be entered without a substantial increase in keyboard complexity.

20 Claims, 3 Drawing Figures

TRANSACTION TERMINAL WITH UNLIMITED RANGE OF FUNCTIONS

CROSS-REFERENCE TO RELATED APPLICATIONS

This application is related to the following patent applications which are concurrently filed herewith and assigned to a common assignee:

1. "Transaction Execution System With Secure Data Storage and Communication," Ser. No. 483,084, Filed June 25, 1974, by Thomas G. Anderson, et al.
2. "Modular Transaction Terminal with Microprocessor Control,"Ser. No. 482,860, Filed June 25, 1974, by William A. Boothroyd.

Background of the Invention

1. Field of the Invention.

This invention relates to a transaction execution terminal and more particularly a cash issue terminal having a keyboard with a plurality of mutually exclusive fields, at least one of the fields including an optional selection key permitting an information state for the field to be indicated by activation of the optical selection key followed by activation of a predetermined combination of keys in a numeric field.

2. History of the Prior Art.

Transaction execution terminals are currently available which permit the execution of a limited number of predetermined transactions. For example one terminal receives payroll checks in a predetermined format, reads the dollar amount of the check and issues cash in the amount of the check. Other transaction terminals have been utilized to extend banking services to a user without need for the immediate presence of a bank teller. Such terminals typically require the insertion of a user credit card followed by the keyboard entry of a personal ID number which corresponds to the credit card and permits a verification of the authenticity thereof. The keyboard is typically divided into a plurality of mutually exclusive fields to permit the user to identify the nature of a requested transaction. For example, a transaction selection field may include a withdraw key, a deposit key, and an account inquiry key. Other keyboard fields may be provided to indicate dollar amounts and bill denominations or entry of a personal ID number. Such terminals are extremely limited in the range of transactions which may be executed and include a separate key for the identification of each information state.

Summary of the Invention

A transaction execution terminal in accordance with the invention includes a mechanical control subsystem, a user communication subsystem, a transaction statement dispenser subsystem, an operator function subsystem, a terminal communication subsystem which may connect the terminal with a large scale data processing system having many accounts in its data base, a processor support subsystem performing hardware oriented terminal control functions, and a control subsystem which operates under program control to supervise and coordinate the operations of the other subsystems. The user communication subsystem includes an optical display and a keyboard through which transaction request information may be entered by a user. The keyboard contains a plurality of mutually exclusive fields including a transaction selection field, a from account field, a to account field, and a numeric field. The transaction selection, from account and to account fields each contain an optional selection key, the activation of which permits a user to define the information which is to be entered for that field by subsequently activating a selected combination of keyboard keys in accordance with a predetermined schedule. The modifier technique permits separate keys to define the more commonly used information categories of each field without encoding while encoded modifiers used in conjunction with the optional selection keys provide for expansion to an unlimited number of additional categories without significantly increasing the size or complexity of the keyboard.

In a preferred example, the transaction execution terminal is implemented as a cash issuing banking terminal. Connection of the terminal to an on-line host data processing system with real time access to the bank's customer accounts permits optimal screening of transaction requests prior to execution and immediate adjustment of relevant accounts after execution of a requested transaction. An optional off-line host records transaction information for later account updating. In a typical application a user inserts a credit card containing information magnetically stored thereon into the machine and then enters a personal ID number through the numeric field of the keyboard. After reading the magnetic information from the credit card and verifying the authenticity thereof by making a preliminary determination of a correspondence between the credit card information and the personal ID number, the terminal permits the selection of a transactions. Specific keys are provided for the more common transactions such as the issuance of cash, account inquiry, funds transfer, deposit, payment by deposit, or payment by funds transfer. Other transactions may be selected by activation of the optional selection key. Following activation of the optional selection key, the user activates a selected combination of keys in the numeric keyboard field to identify a particular transaction in accordance with a prearranged schedule or code. For example, a bank may have a published schedule of additional functions and code numbers which may be selected by any user. These functions may include the opening of a Christmas card account, a request for additional blank checks, a purchase of travel insurance or any other prearranged transaction that a bank may wish to accommodate. In addition, a user may arrange to transact other business through the terminal which may be applicable only to him. For example, one optional code may be predetermined to represent a request to renew an automobile insurance policy while the same code when entered by a different user might represent a request to borrow money against a prearranged line of credit.

Following selection of the transaction, a key within the from account field is activated if this field is applicable. Specific keys are provided to permit funds to be selectively transferred from a checking account, a savings account or a credit card account. Activation of the optional selection key permits additional accounts to be selected for debiting by using numeric modifier keys in accordance with a prearranged encoded schedule. The to account field may be implemented in a manner identical to the from account field. This permits the identification of an account to which funds are to be transferred if applicable. For instance, a person may wish to transfer funds from his savings account to his checking account or from a credit card account to pay his electric bill by transferring funds from his credit card account to a special utility account. The selective encoding of transaction functions thus permits the functional utility of the keyboard to be greatly expanded without an attendant increase in hardware complexity.

BRIEF DESCRIPTION OF THE DRAWINGS

A better understanding of the invention may be had from a consideration of the following detailed description taken in conjunction with the accompanying drawings in which.

Detailed Description

Figure 1:
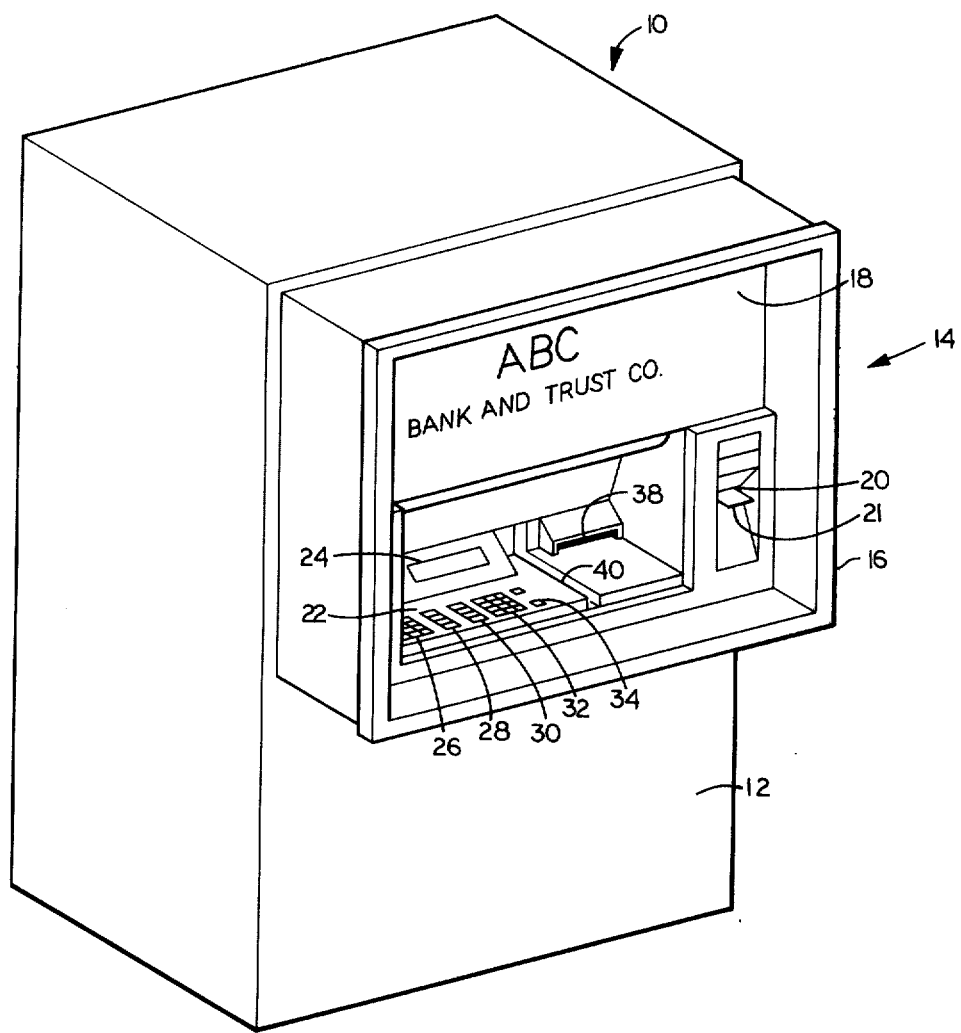
FIG. 1 is a perspective drawing of a transaction execution terminal in accordance with the invention.

As shown in FIG. 1 a transaction execution terminal 10 in accordance with the invention includes an outer security shell or enclosure 12 and a user access panel 14. The user access panel 14 includes a privacy panel 16 which surrounds the user access panel and extends forward therefrom to shield user activity from the observation of nearby persons. A logo panel 18 occupies approximately the upper half of the area of the user access panel 14. The logo panel 18 permits identification of the proprietor of the terminal 10 and accommodates a protective translucent door which is raised behind the panel 18 when the terminal 10 is in use. When the terminal 10 is not in use the door is lowered or closed to protect the keyboard and optical display area of the user access panel 14 from the weather and damage by unauthorized persons. The terminal 10 is shown in FIG. 1 with door protective dooe raised behind the logo panel 18 and therefore obscured from view. A credit card receiving slot 20 is positioned in the lower right-hand portion of the user access panel 14 and is not covered when the protective door is closed if the terminal 10 is displaying an open condition. A person wishing to use the terminal 10 inserts a credit card 21 through the slot 20. If the terminal 10 is able to read information which is magnetically recorded on the card without parity error and if the information corresponds to acceptable card information, the protective door is opened to make a keyboard 22 and an optical display 24 available to the user. If the data recorded on the credit card is found unacceptable, the card is returned to the slot 20 and the protective door remains closed while an illuminated message which informs the user of the unacceptability of the card is visible through the translucent door.

The keyboard 22 includes five separate keyboard fields. These fields include a transaction selection field 26, a from account field 28, a to account field 30, a numberic field 32 and an execution control field 34. As soon as the protective door is open a message is illuminated on optical display 24 which instructs the user to enter his personal ID number through the numeric keyboard field 32. The security of the personal ID number is maintained by not displaying the number as it is entered through keyboard 22. The personal ID number has a predetermined correspondence with the credit card and permits a verification of the authenticity of the card. A person who merely finds, steals or forges a credit card is thus unable to ude the terminal 10 without first establishing the corresponding personal ID number. A terminal user is permitted a predetermined number of tries such as three to enter the correct personal ID number within a predetermined time period. If the number is not entered within these predetermined limits the protective door is closed and the credit card is either returned or retained at the option of the terminal proprietor.

After the personal ID number is properly entered the user is instructed by the optical display 24 to select a desired transaction by activating one of the keys within the transaction selection field 26. The keys of the keyboard 22 are arranged in a matrix of eight columns and four rows with the transaction selection field 26 occupying columns 1 and 2. While the individual keyboard keys may have any desired predetermined meaning, the following designations are assumed for this example. The key at row 1 column 1 in the upper left-hand corner of keyboard 22 is a withdraw key or a cash issue key. Activation of this key would indicate that the user wishes to have cash issued to him by the terminal 10 in return for the debiting of one of his accounts. An optional selection key is located at row 2 column 1. Activation of this key permits an expansion of the available transaction functions in accordance with a prearranged schedule that is developed by a terminal proprietor and a user. Activation of the optional selection key followed by the activation of a predetermined combination of keyboard keys permits any prearranged transaction to be selected. For example, a proprietor may have 20 common transaction services having preassigned numberic modifier codes which are available to all users. Any credit card user is thus permitted to activate the optional selection key and then enter one of the modifier codes through the numeric field 32 in order to select one of the prearranged transactions. In addition, the proprietor may make special arrangements for the execution of additional functions with each user on an individual basis. A person wishing to execute one of these individually arranged transactions would activate the optional selection key and then enter the desired modifier code by activation of a selected combination of keys in the numeric field 32 of keyboard 22. The use of other non-numeric keys for modifier codes would, of course, be possible but would increase the likelihood of user confusion and error. In addition, a given user may arrange with the proprietor to assign the optional selection key a particular meaning by itself without need to activate additional keys. The meaning of the optional selection key is thus individually determinable for each separate user.

An account inquiry key is located at row 3 column 1 and causes account information for a particularly identified account to be illuminated on the optical display 24. The displayed account information might include account balance, credit limit, most recent transactions or other information related to the account. Activation of a transfer key located at row 4 column 1 permits the transfer of funds from one user account to another. For example, funds might be transferred from a savings account to a credit card account. A deposit key located at row 1 column 2 enables the subsequent identification of an account to which funds inserted into the terminal 10 through a deposit flap 38 are to be credited. Upon completion of a deposit transaction, deposited materials are transported by the terminal 10 to a storage container which is not accessible to a terminal user. At row 2 column 2 there is located a payment by deposit key which permits a user to pay a bill by transferring funds from a selected user account to a prearranged account belonging to a user creditor. For instance, the user may wish to transfer funds from a savings or checking account to a water district account in order to pay his monthly water bill. In this embodiment the key at row 4 column 2 is not implemented but is reserved for future use.

For this example assume that the user activates the optional selection key at row 2 column 1 and then enters the number 18 through the numeric field 32 to indicate that he wishes to open a special Christmas card account. For the convenience of the user the keys of the account selection, from account and to account fields contain back lights. All of the keys within a field from which the next selection is to be made are lighted to indicate the proper field. As soon as a key is activated the back lights for the non-selected keys are extinguished with the activated key remaining illuminated and the keys within the next field becoming illuminated. Thus, upon selection of the optional selection key only the back light for the key located at row 2 column 1 would remain illuminated within the transaction selection field 26 and all of the keys within the from account field 28 would become illuminated to indicate the next field of selection.

Assuming that the user wishes to open the Christmas card account by transferring funds from an ordinary checking account, the user would activate a from checking key at row 1 column 3. This activation would extinguish all of the back lights within the column 3 from account field 28 except for the selected from checking key. Since the to account field 30 is not applicable to the opening of a Christmas savings account, the back light for this field would not be illuminated and the user would next be directed by the optical user guidance display 24 to enter a dollar amount through the numeric keyboard field 32 to indicate the amount of the initial deposit. Other keys which the user might have selected within the from account field 28 include a from savings key at row 2 column 3, a from credit card key at row 3 column 3 and from optional selection key at row 4 column 3.

The from optional selection key of the from account field 28 is analogous to the optional selection key of the function selection field 26. If a user wishes to open accounts such as multiple business accounts in addition to the usual checking, savings and credit card accounts he arranges a schedule with the terminal proprietor wherein a number is assigned to correspond to each of the separate accounts. Funds can then be transferred from any selected account by activating the from optional selection key and then entering a prearranged modifier code through the numeric field 32 of the keyboard to indicate a number corresponding to the additional account from which funds are to be debited. For example, if a user desires to transfer funds from an account having a prearranged number 20 to another additional account having a prearranged number 6, he would begin the transaction request by activating the transfer key at row 4 column 1 within the function selection field and would then activate the from optional selection key at row 4 column 3. Upon activation of the from optional selection key the back lights of the remaining keys within the form account field 28 would be extinguished and only the transfer key at row 4 column 1 and the from optional selection key at row 4 column 3 would remain back lighted. The optical display would then instruct the user to enter the code number corresponding to the desired additional account through the numeric keyboard field 32. Upon entry of the number 20 the back lights of the to account field at column 4 would become illuminated and the optical display 24 would instruct the user to select an account to which the funds are to be transferred. The keys of the to account field 30 in column four correspond to the keys of the from account field 28 in column 3. In other words, a to checking key is at row one, a to savings key is at row two, a to credit card key is at row three, and a to optional selection key is at now four.

In the present example the user would activate a to optional selection account key at row 4 column 4 and the back lights on the remaining keys within the two account field 30 would be extinguished. This would leave the transfer key row 4 column 1, the from optional selection key at row 4 column 3 and the to optional selection key at row 4 column 4 illuminated. The optical display 24 would next instruct the user to enter a number identifying the additional account to which funds are to be transferred through the numeric keyboard field 32. In the present example the user would activate a key corresponding to number 6. Although not required, it would normally be expected that the numeric modifier codes for identification of optional selection accounts would be the same for both the to account field and the from account field.

Upon selection of the account to which funds are to be transferred, the optical display 24 would direct the user to enter the dollar amount of the requested transfer through the numeric keyboard field 32. While the specific arrangement of the numeric keyboard field is not material to the present invention, it will be assumed that this field occupies columns 5, 6 and 7 with keys corresponding to numerals 1, 2 and 3 in row 1, keys corresponding to numerals 4, 5 and 6 in row 2, keys corresponding to numerals 7, 8 and 9 in row 3, and keys corresponding to correction, numeral 0 and decimal point in row 4. The user thus indicates a dollar amount, for example, by activating keys 2, 1, 4, decimal, 3 and 3 to indicate the amount $214.33.

If operating on-line with a host data processing system the terminal 10 would communicate the credit card and user request information to the host data processing system in a transaction request message upon completion of the entry of the dollar amount. After verifying the personal ID number, the existence of the accounts, and the sufficiency of funds, the host data processing system would authorize completion of the requested transaction. This authorization might also include a command to require verification of the transaction prior to execution. The user would then be requested to order the execution or cancellation of the transaction and the essence of the transaction would be illuminated on the optical display 24. The user would then have the option of cancelling the transaction by activating a cancel key with the execution control field 34 at row 1 column 8 or of commanding execution of the transaction by activating a proceed key at row 4 column 8 within the execution control field 34. The keys at row 2 column 8 and row 3 column 8 are not implemented in this example but are available for additional execution control functions if desired.

A terminal 10 in accordance with this invention thus provides tremendous flexibility in the identification of a desired transaction by providing optional selection keys which permit encoded identification of an unlimited number of special functions or accounts as well as individual specific keys which permit the unencoded selection of the most common functions and accounts by the activation of a single key. This arrangement thus combines the simplicity of single key activation for the commonly utilized functions and accounts with the capability of expanding the available functions and accounts through multiple key activation.

Figure 2:
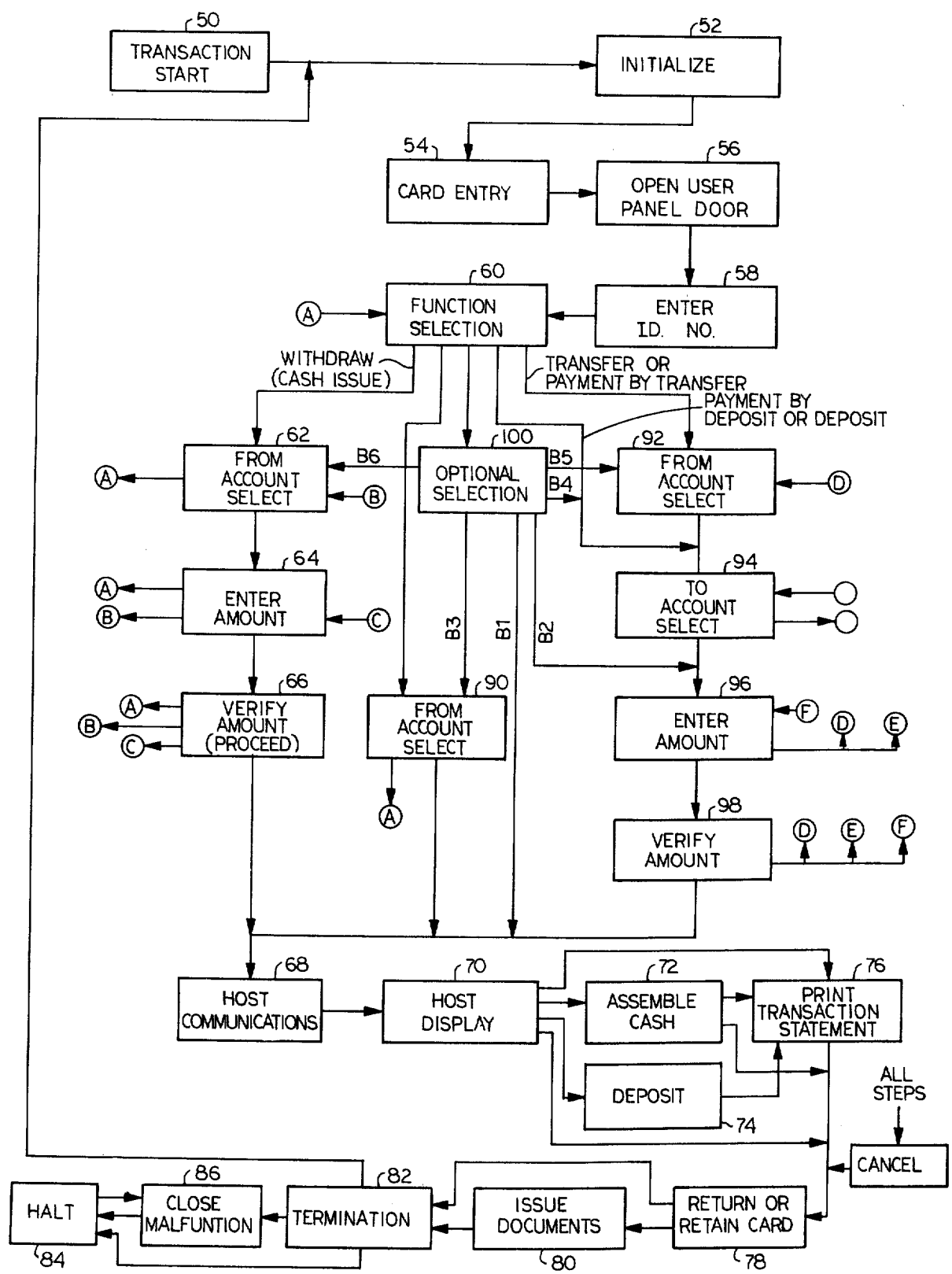
FIG. 2 is an operational flow chart illustrating the steps and branches involved in the operation of the transaction execution terminal shown in FIG. 1.

An operational flowchart of the transaction execution terminal 10 is shown in FIG. 2. A transaction begins with the insertion of a credit card 21 in the credit card slot 20 at step 50. Upon detection of the insertion of a credit card part way into the slot 20, the terminal 10 is initialized for the start of a new transaction at step 52. This initialization 52 includes the resetting of any system status registers which may have been set during the course of the execution of a previous transaction and the performance of any other functions which might be necessary to prepare the terminal 10 to receive a new transaction request.

Following initialization a card entry step 54 is executed in which the partially inserted card is transported completely into the terminal 10 and past a read head to a rest location. As the credit card passed beneath the read head, information stored on a magnetic stripe is read therefrom. The information which is read from the card is then checked for parity, for a longitudinal redundancy check character (LRC), and for proper message formats such as a start of card character (SOC) or end of card character (EOC). If one of these read error conditions is detected the credit card may be reread and is returned back through the slot 20 after a selected number of retries. A message is illuminated on the guidance display 24 which is visible through the closed unit translucent panel door, to indicate that the card is not acceptable. After the information has been read from a card in the proper format and without parity error, the terminal proprietor, at its option, may require a check of a bank number which is read from the magnetic stripe. If the bank number is not one which is acceptable to the terminal 10, the card is returned and a message is illuminated on a display panel 38 to indicate that the card is invalid at the terminal 10.

Once the determination is made that the information read from the credit card is acceptable, the panel door covering the user display 24 and keyboard 22 is opened at step 56. If the terminal is unable to successfully open the door, the transaction is cancelled with the credit card 21 being returned to the user through slot 20 and the terminal 10 closes. A status message indicating this door jam error condition is sent to the host data processing system. After the door is successfully opened, or if the door was already opened, an enter ID number step 58 is executed. During the course of this step 58 the display 24 is illuminated to request the user to enter his personal ID number through the numeric field 32 of keyboard 22. During the course of this step 58 a user is allowed a predetermined number of tries such as three with a predetermined time limit such as sixty seconds to enter a six digit personal ID number. Upon entry of an ID number at least a portion of the number may be checked (at the option of the bank) for a predetermined correspondence with selected information which has been read from the credit card. If a user fails to enter an acceptable ID number within a predetermined period of time and number of tries, one of two alternatives may occur, at the option of the terminal proprietor. If a partial message option is selected, a status message is sent to the host data processing system which contains the credit card information and indicates that a proper ID number was not entered. The host may respond by ordering the terminal 10 to either retain or return the credit card and display an appropriate message on optical display 22. The transaction is cancelled. If a partial message option is not selected, the terminal 10 displays an appropriate message, returns the credit card and cancels the transaction.

Once an acceptable personal ID number has been entered, a function selection step 60 is executed with the back lights of the function selection keyboard field 26 being illuminated and a message being illuminated on optical display 24 asking the user to select a desired function. The sequence of terminal operations can then follow many different paths or branches depending upon which function is selected. If the withdraw key is activated to request the issuance of cash, the user is directed at step 62 to activate a key within the from account select field 28. The user may either activate such a key or return to point A by activating a key within the previously entered function selection field 26. Under normal conditions the user would activate a selected key within the from account field 28 to indicate the account which is to be debited when cash is issued. As noted above, if the user selects the optional selection key within the from account field he must also enter a keyboard code number to identify the optional account which he wishes to select. Once the user has identified the account to be debited he is directed at step 64 to enter the dollar amount of the requested withdrawal. This dollar amount is entered through the numeric keyboard field 32 and displayed on the optical display 24 as it is entered. Instead of advancing to the enter amount field the user may, of course, return to either of the prior fields as indicated by points A and B. Assuming that a dollar amount is entered, the user then must verify at step 66 that he has correctly entered the desired amount by activating the proceed key within the control field 34. In lieu of activating the proceed key the user may return to the function selection field indicated at point A, the from account field indicated at point B or the enter amount numeric field indicated at point C. Upon activation of the proceed key the information read from the credit card is combined with the information entered through the keyboard to generate a transaction request message which is communicated to a host data processing system in a step 68 designated host communications. The host, which may be an on-line data accounting system or merely an off-line transaction recording system, makes whatever checks of the correspondence between the ID number and account number, account balance or other checks that are to be executed and sends back a transaction reply message which tells the terminal how to proceed. Typically the transaction reply message would order the terminal to illuminate at step 70 an appropriate message on optical display 24, to print at step 76 a transaction statement summarizing the withdrawal transaction, to assemble at step 72 the requested cash or to receive at step 74 the requested deposit, and at step 78 to return the user credit card. However, the transaction message may also disapprove the requested transaction with the credit card being either returned to the user or retained by the terminal 10 at step 78. In either case, the issuance of a printed transaction statement is optional. For a normal cash issue transaction, the terminal 10 would display a message on optical display 24 indicating that user should retrieve his credit card 21 from slot 20, would assemble the requested amount of cash within an escrow area within the machine at step 72, would print the commanded transaction statement at step 76 and would assemble the printed statement with the cash, and return the card 21 through the slot 20 at step 78. After the card is returned through the slot 20 the terminal 10 issues at step 80 the cash and transaction statement which have been assembled in the escrow area through the slot 40. Upon removal of the issued documents from the slot 40, the terminal undergoes a termination step 82 in which a status message is sent to the host to indicate that the transaction has been completed and in which the access panel door is closed. In the event that the cash is removed and a credit card is reinserted before the panel door is closed the terminal control passes to the initialize step 52. In the event that the credit card is not reinserted, the terminal enters a halt condition 84.

At any time prior to the time the terminal 10 begins to actually issue cash through the slot 40, the user may activate the cancel key within the control field 34. Upon activation of this key the terminal control optionally passes to the return or retain credit card step 78 with the card being returned and the termination step 82 then being executed. Alternatively, an incomplete transaction request message may be sent to the host with the host directing credit card control. In the event that a malfunction occurs, the credit card return or retain step 78 is executed is possible, the termination step 82 is executed to the extent possible and then at step 86 the terminal enters a closed condition as a result of the malfunction. A status message sent during the execution of the termination step would inform the host of the malfunction and closure condition.

In the event that the user activates the inquiry key within the function selection field 26 during the function selection step 60, control passes to a step 90 wherein he is next directed to activate a key within the from account select field 28. After the desired account is selected, the transaction request message is sent to the host data processing system at step 68. If all authorization tests are passed, the host sends back a transaction reply message which directs the terminal 10 to display appropriate account information for the selected account on the optical display 24 at step 70. In addition, a transaction statement may be optionally printed at step 76 which provides account information. After a lapse of a predetermined time or upon activation of the cancel key, the credit card 21 is returned through slot 20, a transaction statement is issued at step 80 after the credit card 21 is removed if appropriate, and the terminal executes a termination step 82 before proceeding to a halt condition 84.

In the event that the user activates either the transfer key or the payment by transfer key within the function selection field 26 at step 60, the sequence of operating steps includes the activation of a key within the from account select field 28 at step 92, the activation of a key within the to account select field 30 at step 94, the entry of a dollar amount through the numeric field 32 while entered amounts are indicated on optical display 24 at step 96, and verification of the desired amount by activation of the proceed key within keyboard control field 34 at step 98. The transaction request message is then assembled and sent to the host which responds with the transaction reply message. The transaction reply message commands the terminal to display an appropriate message indicating whether the transaction is approved or disapproved, to print a transaction statement summarizing the transaction if desired at step 76. The terminal then returns the credit card at step 78 and transaction statement if appropriate at step 80 before executing the termination step 82 and halting 84.

In the event that the user selects a deposit key or payment by deposit key within the function selection field 26 at step 60, the operation sequence jumps to the selection of a key within the to account select field 30 at step 94. Since the selected function indicates the source of the funds, i.e., by deposit, the from account select field 28 selection step 94 is omitted from the sequence. After the account to which the deposited funds are to be deposited or paid is selected, the dollar amount must be entered through the numeric keyboard 32 at step 96 and verified by activation of the proceed key within the execution control field 34 at step 98. It should be noted that the optional selection key within the to account select field 30 is particularly useful in permitting a user to select any one of a large number of potential creditors to which funds are to be paid. As with the optional selection key within the from account field, the user first activates the optional selection key within the to account field and then enters a code number through the numeric keyboard 32 which must correspond to a prearranged schedule to indicate the account to which the deposited funds are to be credited. Upon verification of the dollar amount, the transaction request message is sent at step 68 to the host which responds with the transaction reply message. Assuming that the transaction is authorized, a message is illuminated at step 70 on optical display 24 which directs the user at step 74 to enter the deposit through deposit flap 38. A transaction statement is then optionally printed at step 76 and the credit card 21 is returned to the user through slot 20 at step 78. After the credit card is returned the transaction statement is issued at step 80 through slot 40 if such a statement has been printed and the terminal executes the termination step 82 by sending a status message to the host and closing the access panel door.

In the event that the optional selection key is activated within the function selection field 26 at step 60 the sequence of operations is variable and depends upon the particular function which is indicated by entry of a number through the numeric keyboard field 32 at step 100. The various alternative available sequences are designated B1-B6 in FIG. 2. In order to permit the terminal 10 to direct the proper operating sequence, a plurality of number fields may be established with boundary numbers being selected to define the boundaries between the established fields. These boundary numbers are loaded into the terminal during initialization so that the boundary numbers may be selected at the option of the terminal proprietor and may be changed from time to time. For example it may be desirable to have a given modifier code number define an open Christmas savings account at Christmas time but define a bond purchase transaction at other times. In a typical situation only three operating sequences might be available upon activation of the optional selection key with the number fields corresponding to these sequences being defined by two boundary numbers. For example, the boundary numbers 100 and 200 would define a first field corresponding to path B1 having numbers 1–99, a second field corresponding to path B2 having numbers 101–199 and a third field corresponding to path B3 having numbers 201 to 999. If a function within the first field is selected, the terminal 10 needs no further information in order to execute the transaction and the transaction request message is immediately sent to the host. If a second numeric field is selected, a dollar amount is entered and verified at steps 96, 98 before the transaction message is sent to the host. In the event that the user selects an optional function within the third number field, a from account must be identified through the from account field 28 at step 90 before the transaction request message is sent to the host. Additional boundary numbers may be utilized to establish additional numeric fields. For instance, a fourth numeric field may be utilized where the operating steps require identification of a to account, entry of a dollar amount, and verification of the dollar amount at steps 94, 96 and 98 before the transaction request message is sent to the host. A fifth number field may be utilized to identify a path B5 having steps 92, 94, 96 and 98 in which a key must be selected from each of the keyboard fields. A sixth field corresponding to a path B6 may be utilized for transactions requiring identification of a from account, entry of a dollar amount and verification of the dollar amount at steps 62, 64 and 66 before a transaction request message is sent to the host. By delimiting various optional selection number fields with boundary numbers as explained above, it is thus possible to define any desired operating sequence for the terminal 10. As a result, the optional selection key within the function selection field 26 becomes a very powerful tool in expanding the functions which may be executed by the terminal 10 without making the keyboard 22 excessively complex. At the same time specific keys are available for the more commonly selected functions for the convenience of a terminal user.

Figure 3:
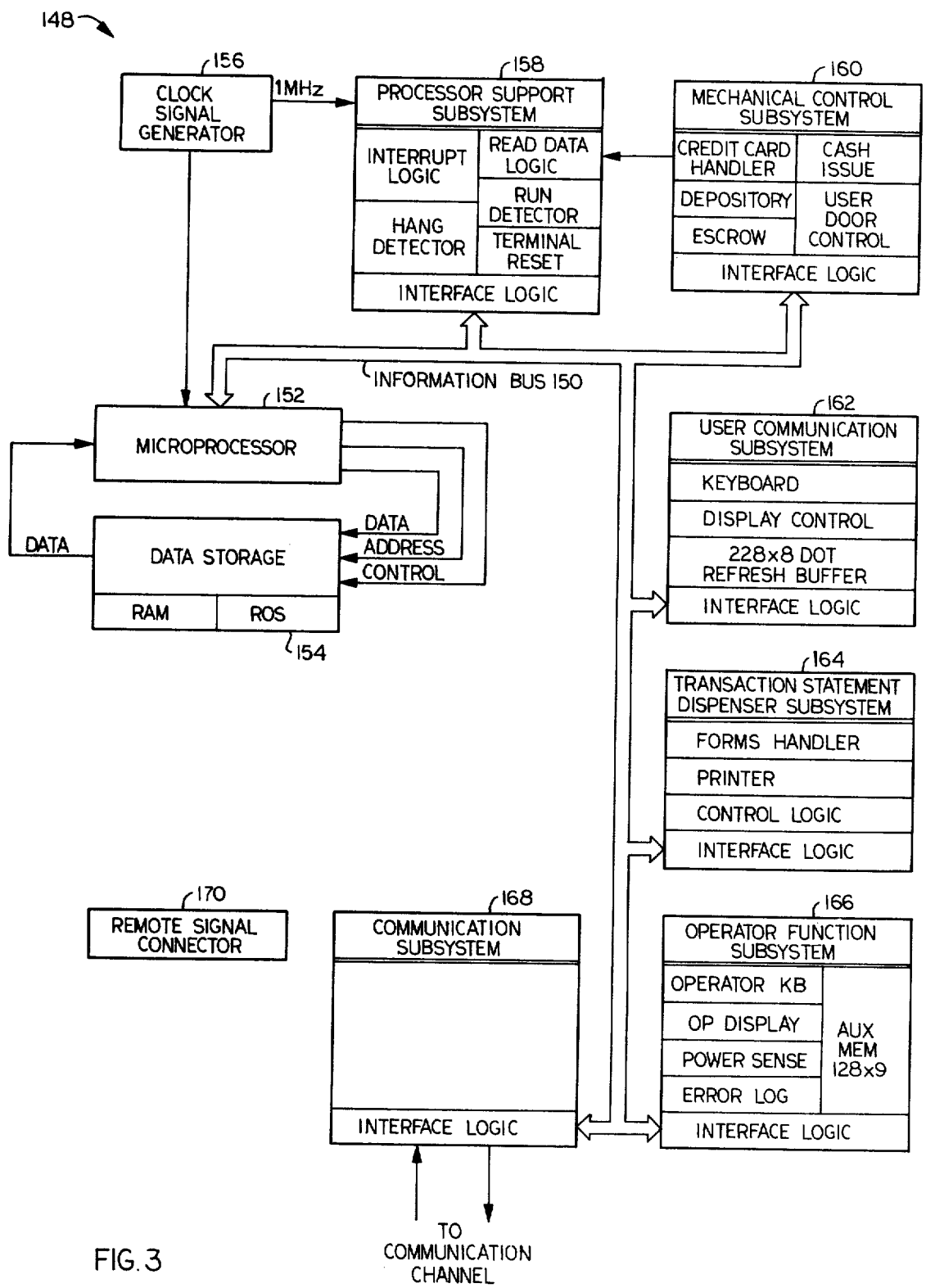
FIG. 3 is a block diagram representation of the operational subsystems of the transaction execution terminal shown in FIG. 1.

The elctromechanical implementation of a preferred embodiment of the terminal 10 is illustrated in FIG. 3 as including a control system 148 having a number of operational subsystems interconnected by a parallel information bus 150. Supervisory control of the terminal 10 is exercised by a control subsystem which includes a microprocesser 152 and data storage 154. Data storage 154 includes a random access memory (RAM) portion and read only storage (ROS) portion. Program and data information is stored in data storage 154 with the volatile RAM portion being reloaded by an initialization image received from an associated host data processing system at power turnon. The read only storage typically contains program and data information which is common to all terminals 10 regardless of the proprietor and need not be reloaded since it is nonvolatile. The microprocessor 152 operates under control of a stored program to receive information from the various terminal subsystems via information bus 150, process the information and command the operational subsystems in accordance with the processed information.

A clock signal generator 156 provides a first clock signal to microprocessor 152 and a second 1 MHz clock signal to a processor support subsystem 158. Processor support subsystem 158 is functionally closely associated with the microprocessor 152 and provides the operational control functions which are preferably implemented with hardware rather than through programming of the microprocessor 152. Subsystem 158 includes interrupt logic which provides a time base by generating interrupt requests at 10 MSEC intervals derived by further dividing the 1 MHz clock signal. These timing interrupts are utilized by the microprocessor 152 to maintain a continuous clock time information base and time various mechanical and data entry functions as required by the operating programs. Also included in the processor support subsystem 158 is a read data logic circuit which receives the output signal from the read head of the credit card reader and converts the reaad head output signal to digital data signals which may process by the microprocessor 152. A run detector monitors the states of signals on the terminal of the information bus 150 and generates a run signal so long as the timing interrupts are being processed. A hand detector also monitors the bus 150 and commands terminal reset circuitry within subsystem 158 to reset the terminal electronics if the hang detector senses a hang up condition as indicated by the failure of signals on the information bus 150 to change within a predetermined period of time. Interface logic provides communication between the information bus 150 and the various circuits of the processor support subsystem 158.

A mechanical control subsystem 160 is connected for communication along information bus 150 via interface logic and includes the majority of the hardware functions required for operation of a terminal 10. These functions include the handling, transporting and reading of user credit cards, the issuance of cash, the control of a depository through which user deposits are handled, the control of an escrow area where cash and printed transaction statements are assembled for checking prior to issuance to a user and control of the door which covers the user display and keyboard panel 14.

The user communication subsystem 162 is also connected to information bus 150 through suitable interfae logic. The communication subsystem 162 includes keyboard circuitry which senses and assembles information indicating the activation of keys on the keyboard 22 and controls the back lighting for the keys. Display control including a 224x8 refresher buffer for the 222 by 7 dot display receives display commands over the information bus 150 and continues to display command information at given optical display locations until contrary commands are received.

A transaction statement dispenser subsystem 164 includes form handling apparatus, a printer and control logic for printing transaction statement information commanded by the microprocessor 152 on blank forms and then transporting the printed forms to an excrow area. At the escrow area they are assembled along with requested cash prior to issuance to the user through a document issue slot 40.

An operator function subsystem 166 is connected through interface logic to the information bus 150 and provides communication with a terminal maintenance operator as opposed to a terminal user. The subsystem 166 includes data entry switches, a two-digit hexadecimal display, power sense circuitry and error log circuitry. The display permits the maintenance operator to obtain limited information on the status of the terminal 10 and the switches permit the entry of limited information such as an encription key which is destroyed each time an operator maintenance function is commanded by the switches. A power protected auxiliary memory within the operator function subsystem 166 stores vital information such as encription keys and accumulated terminal error information. The auxiliary memory contains battery powered information protection circuitry which is activated to protect information loss of memory in the event that the power sense circuitry detects an impending failure. The error log circuitry detects, counts and records in the auxiliary memory various categories of terminal error conditions which occur while a terminal 10 is in operation.

A communication subsystem 168 is connected to bus 150 through interface logic and provides the communications interface between the terminal 10 and a communications channel. All timing and control functions required for data communications are handled by communication subsystem 168.

A remote signal connector 170 provides communiation between a terminal 10 and a centralized control panel for the convenience of a proprietor of the terminal 10. For instance, it may be desired to communicate information such as an open or closed condition, a transaction statement forms out condition, a cash out condition, or other conditions indicating that a terminal needs servicing to a centralized location. If a proprietor maintains several terminals 10, a scan of a control panel at the centralized location will permit a determination of whether or not any of the terminals need servicing. In addition, it may be desirable to provide a limited number of terminal control functions through the centralized control panel. For instance reset commands, open and close commands, and commands to test the communication link between a terminal 10 and a host data processing system may be implemented through the centralized control panel which is interfaced through remote signal connector 170.

Although a particular embodiment of a transaction execution terminal having optional selection keys in accordance with the invention has been described for the purpose of illustrating the manner in which the invention may be used to advantage, it will be appreciated that the invention is not limited thereto. Accordingly, any modification, variation or equivalent arrangement within the scope of appended claims should be considered to be within the scope of the invention.

We claim:
1. A transaction execution terminal comprising:
a card handling subsystem which receives cards and reads information stored on received cards under control of a control subsystem;
a selectively variable display operating under control of a control subsystem and displaying information commanded by a control subsystem;
a user keyboard having keys arranged in a plurality of keyboard fields with each keyboard field being related to a predetermined category of user transaction request information and including a plurality of keys each defining different mutually exclusive information states for the cetegory of user transaction request information to which the field relates, one key within at least one field being a variable information state key, the activation of which indicates that the information state indicated thereby is to be determined by a combination of at least one subsequent keyboard key activation in conjunction with a predeteremined schecule correlating key activation combinations with information states; and
a control subsystem which controls the operation of the card handling subsystem and receives account card information therefrom, which commands the display of information on the variable display to aid a terminal user in the use of the terminal, and which receives keyboard key activtion information in a predetermined sequence requiring one information state indication from each of a plurality of successive keyboard fields.

2. The transaction execution terminal as set forth in claim 1 above, wherein one of the keyboard fields is a transaction selection field containing a variable information state key and a plurality of other keys, each other key permitting a different type of transaction request to be indicated by the activation thereof.

3. The transaction execution terminal as set forth in claim 1 above, wherein one of the keyboard fields is a from account field containing a variable information state key and a plurality of other keys, each other key in the from account field permitting a different account from which funds are to be removed to be wholly identified by the activation thereof.

4. The transaction execution terminal as set forth in claim 1 above, wherein one of the keyboard fields is a to account field containing a variable information state key and a plurality of other keys, each other key in the to account field permitting a different account to which funds are to be added to be completely identified by the activation thereof.

5. The transaction execution terminal as set forth in claim 1 above, wherein one of the keyboard fields is a numeric keyboard field including a plurality of numeric keys, each permitting an indication of a different number by the activation thereof and wherein an information state indicated by the activation of a variable information state key is determinable by the subsequent activation of a combination of at least one key within the numeric field.

6. The transaction execution terminal as set forth in claim 1 above, further comprising cash issue subsystem which operates in response to the control subsystem to issue a requested amount of cash to a terminal user and wherein the control subsystem is further controls the cash issue subsystem to cause the issuance of a requested amount of cash in response to the satisfaction of a set of predetermined conditions.

7. The transaction execution terminal as set forth in claim 6 above, wherein the keyboard includes a transaction selection field permitting a requested type of transaction to be indicated by the activation of a key therein, a from account field permitting an account from which funds are to be taken to be indicated by the activation of a key therein, a to account field permitting an account to which funds are to be added to be indicated by the activation of a key therein, and a numeric field permitting a number to be indicated by the selective activation of one or more keys therein, and wherein the transaction selection field, from account field and to account field each include a variable information state key.

8. The transaction execution terminal as set forth in claim 7 above, wherein the transaction selection keyboard field includes a withdraw key, the activation of which indicates a cash issue transaction request; an account inquiry key, the activation of which indicates a request to have information pertaining to a selected account displayed by the variable display; and a transfer key, the activation of which indicates a request to have a selected quantity transferred from one account to a different account; wherein the to account field includes a from checking account key, the activation of which indicates that funds are to be transferred from a user checking account; a from savings account key, the activation of which indicates that funds are to be transferred from a user savings account; and a from credit card account key indicating that funds are to be transferred from a user credit card acount; and wherein the to account keyboard field includes a to checking account key, the activation of which indicates that funds are to be transferred to a user checking account; a to savings account key, the activation of which indicates that funds are to be transferred to a user savings account; and a to credit card account key, the activation of which indicates that funds are to be transferred to a user credit card account.

9. The transaction execution terminal as set forth in claim 6 above, further comprising a transaction statement subsystem which operates in response to the control subsystem to issue documents providing written records of executed transactions and wherein the control subsystem further controls the issuance by the transaction statement subsystem of documents providing written records of executed transactions.

10. The transaction execution terminal as set forth in claim 7 above, further comprising a communication subsystem which operates in response to the control subsystem to provide bidirectional communication between the transaction terminal and a central data processing system having a data base storing account information for potential terminal users, and wherein the control subsystem controls the transmission of transaction request information to the central data processing system nd controls the execution of requested transactions in accordance with commands received from the central data processing system.

11. The transaction execution terminal as set forth in claim 2 above, wherein the transactions which may be selected subsequent to the activation of the variable information state key of the transaction selection keyboard field include the sending of blank checks to the user, the opening of a Christmas savings account, the closing of a selected account and the purchase of travel insurance.

12. The transaction execution terminal as set forth in claim 5 above, wherein at least one of the keyboard fields is a function selection field permitting the identification of a particular type of transaction which the user wishes to have executed, wherein the function selection field includes a variable information state key, wherein the combinations of numeric key activations which subsequently determine the information state indicated by activation of the function selection field variable information state key are arranged by predetermination in to a plurality of categories of sequential function indication numbers, and wherein all functions which are indicated by the same category of sequential function indication numbers require the entry of information from the same keyboard fields for the complete identification of a requested transaction.

13. The transaction execution terminal as set forth in claim 12 above, wherein the control subsystems stores a plurality of variable inforamtion state delineation numbers, each defining the boundary between two categories of sequential function indication numbers.

14. The transaction execution terminal as set forth in claim 12 above, wherein at least one category of sequential function indication numbers requires the entry of no additional keyboard information to fully identify a requested transaction.

15. The transaction execution terminal as set forth in claim 12 above, wherein at least one category of sequential function indication numbers requires the further entry of an amount through the numeric keyboard field but no further identification of any account by key activation.

16. The transaction execution terminal as set forth in claim 12, wherein at least one category of sequential function indication numbers requires the further entry of information by keyboard key activation of information indicating an account from which funds are to be withdrawn.

17. A transaction execution terminal comprising:
a card handling subsystem which operates in response to control system commands to receive a card having information recorded thereon and read said recorded information;
a document handling system which operates in response to control system commands to selectively issue documents to a terminal user;
a keyboard having a plurality of keyboard fields including a function selection keyboard field having a plurality of nonencoded keys, each of which indicates a selected function by the activation thereof, and at least one optional selection key, the activation of which permits a selected function to be indicated by the subsequent activation of a seleccted combination of keyboard keys in accordance with a predetermined code; and
a control system connected to receive card information from the card handling subsystem and keyboard information from the keyboard and generate control system commands which are coupled to control the operation of the card handling subsystem and document handling system in response thereto.

18. A terminal for performing a plurality of different banking functions under control of a bank customer, comprising:
card reading means for reading customer account identification information from an encoded card;
first customer operable keyboard means for selectively designating one of a plurality of transaction types, at least one of said types being definable by an application program resident in an remote host computer in response to the activation of a first keyboard means key and a combination of second keyboard means keys;
second customer operable keyboard means for selectively modifying at least one key of the first keyboard means to define a selected transaction in accordance with a predetermined code; and
means responsive to data key activation on said first and second keyboard means and information read by said card reading means for transmitting a message to a remote host which message indicates the information read by the card reading means and the keys which a user activates on the first and seond keyboard means.

19. A transaction execution system comprising:
a host data processing system storing information for a plurality of customer accounts; and a transaction execution terminal in communication with the host data processing system, the terminal including:

a card handler which receives an account card and reads customer identification information encoded thereon;

an optical display which displays selected messages to aid a user in the operation of the terminal;

a keyboard connected to input information to the terminal in response to the activation of keys by a user, the keyboard being divided into a plurality of mutually exclusive fields with each field being utilized for the entry of a different category of information relating to a user transaction request, and at least one of the fields including a plurality of keys wherein one key with the field is activated to the exclusion of other keys in the field to specify information corresponding to a requested transaction, at least one key within the field being an optical selection key, the activation of which indicates that the category of information to which the field pertains is to be specified by the subsequent activation of a predetermined combination of one or more keys on the keyboard; and control circuitry coupled to the host data processing system, card handler, optical display and keyboard, the control circuitry controlling the operation of the card holder, display and keyboard, communicating user transaction related information between the host data processing system and the terminal, and controlling terminal operation to cause the terminal to execute user requested transactions on command from the host data processing system.

20. A transaction execution system which receives transaction request information and user identification information and executes requested transactions, the system having a card reader which reads information from a user card and being characterized by a keyboard through which user information is input to the system and which has at least two different keyboard fields with at least one of the fields including a plurality of keys of which one key within the field is activated to the exclusion of the other keys in the field to specify information corresponding to a requested transaction, at least one key within the field being an optional selection key, the activation of which indicates that the category of information to which the field pertains is to be specified by the subsequent activation of a predetermined combination of one or more keys on the keyboard.

* * * * *